(12) United States Patent
Leone et al.

(10) Patent No.: US 9,328,677 B2
(45) Date of Patent: May 3, 2016

(54) USAGE STRATEGY FOR MIXED GASOLINE AND CNG FUELED VEHICLES

(71) Applicant: Ford Global Technologies, LLC, Dearborn, MI (US)

(72) Inventors: Thomas G. Leone, Ypsilanti, MI (US); Mark Allen Dearth, Dearborn, MI (US); Joseph Norman Ulrey, Dearborn, MI (US); David Karl Bidner, Livonia, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 14/051,333

(22) Filed: Oct. 10, 2013

(65) Prior Publication Data

US 2015/0101566 A1 Apr. 16, 2015

(51) Int. Cl.
*F02M 43/00* (2006.01)
*F02D 41/00* (2006.01)
*F02D 41/30* (2006.01)
*F02D 19/08* (2006.01)
*F02P 5/04* (2006.01)
(Continued)

(52) U.S. Cl.
CPC ........ *F02D 41/0027* (2013.01); *F02D 19/0628* (2013.01); *F02D 19/081* (2013.01); *F02D 41/0025* (2013.01); *F02D 41/3094* (2013.01); *F02D 19/0615* (2013.01); *F02D 35/027* (2013.01); *F02D 37/02* (2013.01); *F02D 2200/0404* (2013.01); *F02D 2200/0406* (2013.01); *F02D 2200/0611* (2013.01); *F02P 5/045* (2013.01); *F02P 5/1527* (2013.01)

(58) Field of Classification Search
CPC .......... F02M 37/0064; F02M 63/0225; F02M 25/00; F02M 31/00; F02M 33/00; Y02T 10/36; Y02T 10/121; F02D 19/081; F02D 19/0628; F02D 19/0663; F02D 19/0665; F02D 41/0025; F02D 41/0027; Y02E 60/364; Y02E 60/366
USPC ......... 123/27 GE, 304, 431, 575, 525, 198 A, 123/522, 523
See application file for complete search history.

(56) References Cited

U.S. PATENT DOCUMENTS 5,117,802 A 6/1992 Durbin
5,315,054 A * 5/1994 Teel ................................ 585/14
(Continued)

OTHER PUBLICATIONS

Leone, Thomas G. et al., "Systems and Methods for Determining Amount of Liquid and Gaseous Fuel," U.S. Appl. No. 14/151,683, filed Jan. 9, 2014, 39 pages.
(Continued)

*Primary Examiner* — Hai Huynh
*Assistant Examiner* — Gonzalo Laguarda
(74) *Attorney, Agent, or Firm* — Julia Voutyras; Alleman Hall McCoy Russell & Tuttle LLP

(57) ABSTRACT

A method for an engine, comprising: responsive to a pressure in a fuel tank being below a pressure threshold, injecting only a liquid fuel into an engine cylinder, the fuel tank storing the liquid fuel and a pressurized gaseous fuel partially dissolved in the liquid fuel. In this way, the pressurized gaseous fuel may be conserved, thus maintaining a pressure gradient within the fuel system and allowing for judicious use of the pressurized gaseous fuel, for example during cold start conditions.

19 Claims, 3 Drawing Sheets

(51) Int. Cl.
  *F02P 5/152* (2006.01)
  *F02D 19/06* (2006.01)
  *F02D 35/02* (2006.01)
  *F02D 37/02* (2006.01)

(56) References Cited

U.S. PATENT DOCUMENTS

| | | | |
|---|---|---|---|
| 5,816,224 | A | 10/1998 | Welsh et al. |
| 6,543,423 | B2 | 4/2003 | Dobryden et al. |
| 6,584,780 | B2 | 7/2003 | Hibino et al. |
| 8,037,849 | B1 * | 10/2011 | Staroselsky et al. .......... 123/1 A |
| 8,342,158 | B2 | 1/2013 | Ulrey et al. |
| 2004/0255873 | A1 * | 12/2004 | Cueman et al. .............. 123/1 A |
| 2005/0124836 | A1 * | 6/2005 | Sutton et al. ..................... 585/6 |
| 2008/0223344 | A1 * | 9/2008 | Suzuki et al. ................ 123/525 |
| 2008/0245318 | A1 * | 10/2008 | Kuroki et al. ..................... 123/3 |
| 2009/0076705 | A1 * | 3/2009 | Colesworthy et al. ........ 701/103 |
| 2011/0061622 | A1 | 3/2011 | Lund |
| 2013/0000607 | A1 | 1/2013 | Watanabe |
| 2013/0013183 | A1 | 1/2013 | Surnilla et al. |
| 2013/0160741 | A1 | 6/2013 | Sommars et al. |
| 2014/0238340 | A1 * | 8/2014 | Dunn et al. ................... 123/299 |
| 2014/0352801 | A1 * | 12/2014 | McAlister ..................... 137/312 |
| 2014/0356744 | A1 * | 12/2014 | McAlister ..................... 429/425 |
| 2015/0192450 | A1 * | 7/2015 | Leone et al. .................. 123/299 |
| 2015/0198118 | A1 * | 7/2015 | Leone et al. .................. 123/299 |

OTHER PUBLICATIONS

Lannug, Axel et al., "The Solubility of Methane in Hydrocarbons, Alcohols, Water and Other Solvents," ACTA Chemica Scandinavica 14, pp. 1124-1128, Copenhagen, Denmark, 1960, 5 pages.

Sebastian, Herbert M. et al., "Correlation of the Solubility of Methane in Hydrocarbon Solvents," Ind. Eng. Chem. Fundam., 1981, vol. 20, No. 4, pp. 346-349, American Chemical Society, 4 pages.

Leone, Thomas G. et al., "Refueling Systems and Methods for Mixed Liquid and Gaseous Fuel," U.S. U.S. Appl. No. 14/051,312, filed Oct. 10, 2013, 36 pages.

Leone, Thomas G. et al., "Systems and Methods for Separation of Liquid and Gaseous Fuel for Injection," U.S. Appl. No. 14/152,869, filed Jan. 10, 2014, 37 pages.

* cited by examiner

USAGE STRATEGY FOR MIXED GASOLINE AND CNG FUELED VEHICLES

BACKGROUND AND SUMMARY

Compressed natural gas (CNG) is a high octane fuel that is beneficial for reducing engine knock, for reducing hydrocarbon emissions in cold start events, and for reducing carbon dioxide emissions during engine operations. However, CNG has a low energy density compared to liquid fuels, such as diesel fuel or gasoline. This typically requires packaging of CNG in cryogenic quality cylinders (as liquified natural gas (LNG)) or in high pressure tanks (approximately 200-250 atmospheres).

To increase the range and total fuel quantity stored in a vehicle, CNG may be utilized in conjunction with gasoline or diesel fuel, requiring the vehicle to switch between fuels for optimal performance. However, space constraints do not allow for the inclusion of separate fuel tanks to all vehicles. A preferable system may be one that stores liquid fuel and pressurized gaseous fuel together in a single tank. In particular, CNG is able to partially dissolve in gasoline or diesel fuel when stored together at relatively low pressure (~100 atm).

Storing a mix of pressurized gaseous fuel and liquid fuel within a single tank presents challenges for fuel usage in order to gain the benefits of having both pressurized gaseous fuel and liquid fuel available for combustion. While fuel usage strategies have been developed for vehicles with multiple fuel tanks, these solutions are insufficient to control fuel usage for a vehicle with a single, mixed fuel tank. In some examples, liquid fuel operations may dependent on a fuel tank pressure being above a threshold in order to distribute liquid fuel to a fuel rail. Further, the liquid phase component may contain a mixture of CNG and gasoline or diesel fuel, for example. This mixture has different properties than either CNG or gasoline/diesel fuel alone, and must be accounted for in the vehicle's fuel usage strategy.

The inventors herein have recognized the above problems, and have developed systems and methods to at least partially address these problems. In one example a method for an engine, comprising: responsive to a pressure in a fuel tank being below a pressure threshold, injecting only a liquid fuel into an engine cylinder, the fuel tank storing the liquid fuel and a pressurized gaseous fuel partially dissolved in the liquid fuel. In this way, the pressurized gaseous fuel may be conserved, thus maintaining a pressure gradient within the fuel system and allowing for judicious use of the pressurized gaseous fuel, for example during cold start conditions.

In another example, a fuel system for an internal combustion engine, comprising: a fuel tank configured to store a liquid fuel and a pressurized gaseous fuel capable of partially dissolving in the liquid fuel; a group of direct fuel injectors in communication with a group of cylinders; a first fuel line coupled between the group of direct fuel injectors and the fuel tank, the first fuel line configured to supply liquid fuel to the group of direct fuel injectors; a group of port fuel injectors in communication with the group of cylinders; a second fuel line coupled between the group of port fuel injectors and the fuel tank, the second fuel line configured to supply pressurized gaseous fuel to the group of port fuel injectors; and a controller configured with instructions stored in non-transitory memory and executable by a processor to: responsive to a pressure in the fuel tank being below a pressure threshold, operating the group of cylinders with fuel from the group of direct fuel injectors, and not with fuel from the group of port fuel injectors. In this way, the engine may operate solely on direct-injected liquid fuel while maintaining sufficient octane availability In yet another example, a method for an engine having a fuel tank configured to store a liquid fuel and a pressurized gaseous fuel capable of partially dissolving in the liquid fuel, comprising: responsive to a pressure in the fuel tank being below a pressure threshold, injecting only a liquid fuel into an engine cylinder; and responsive to a liquid level in the fuel tank being below a liquid level threshold, injecting only the pressurized gaseous fuel into the engine cylinder. In this way, the ability of the engine to operate on liquid fuel, pressurized gaseous fuel, or a combination of both fuels as necessary may be maintained based on current fuel availability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example embodiment of a cylinder of an internal combustion engine.

DETAILED DESCRIPTION

Figure 1:
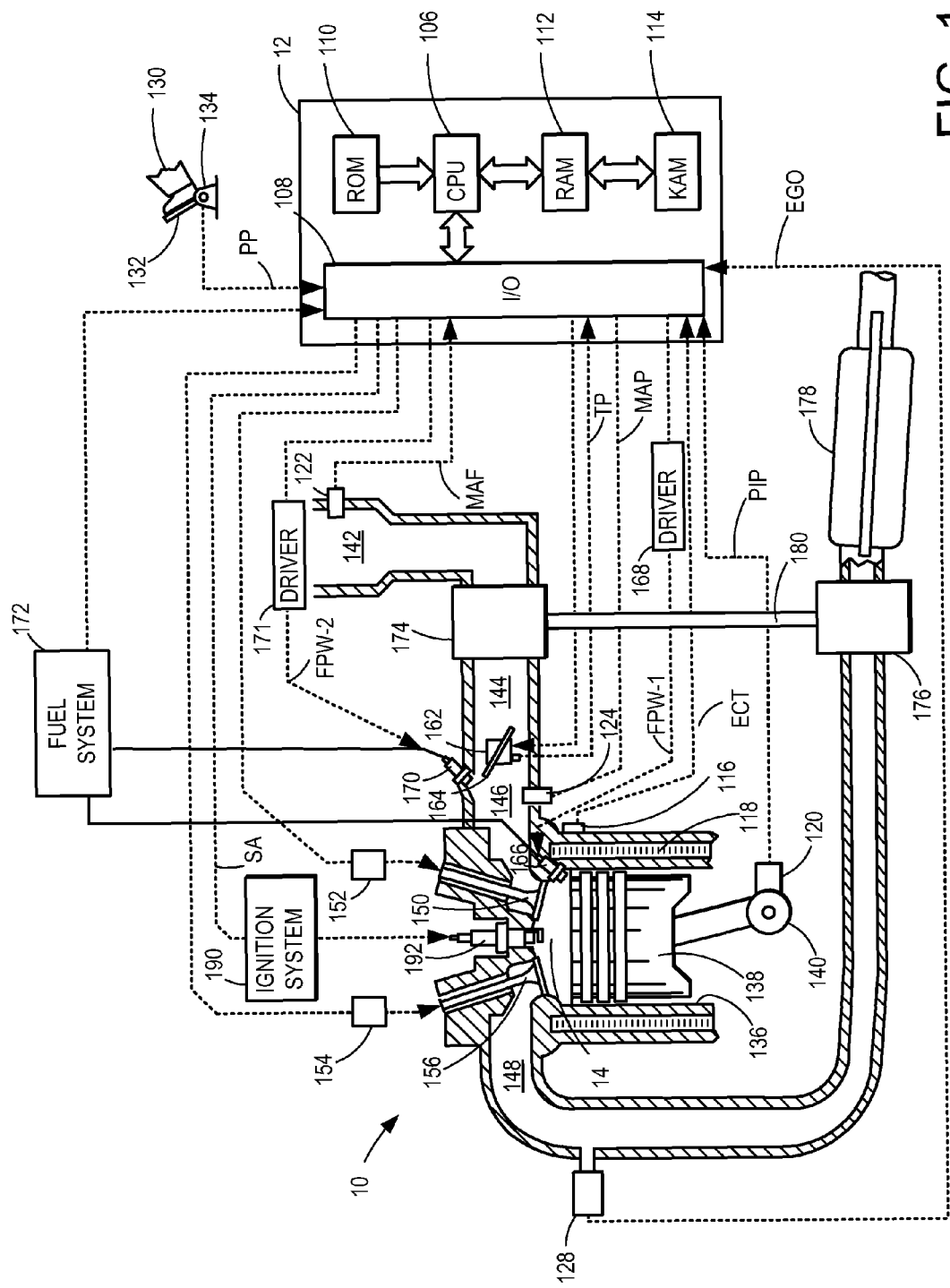
Figure 2:
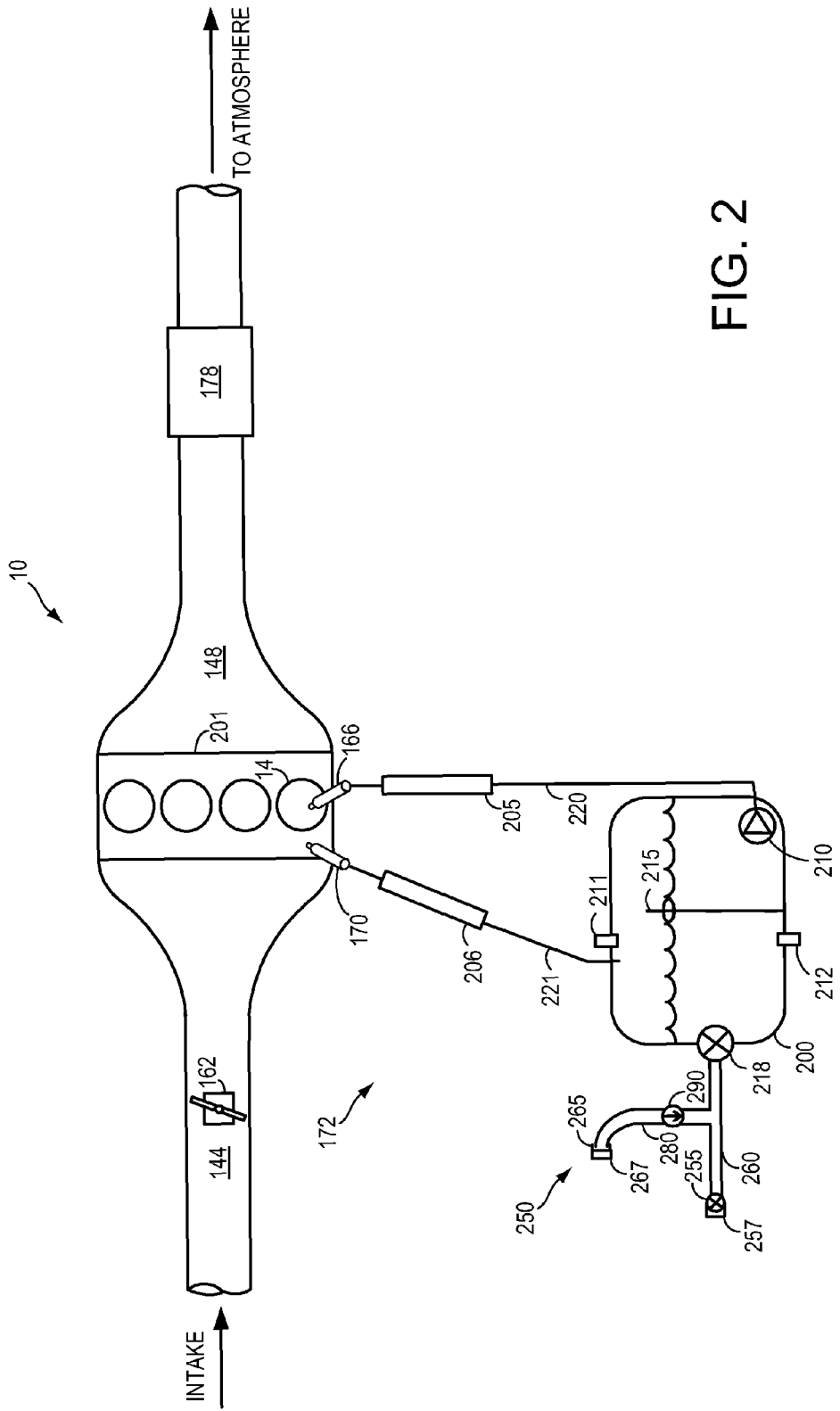
FIG. 2 shows a schematic depiction of an engine and fuel system configured to operate on a mix of gaseous fuel and liquid fuel.
Figure 3:
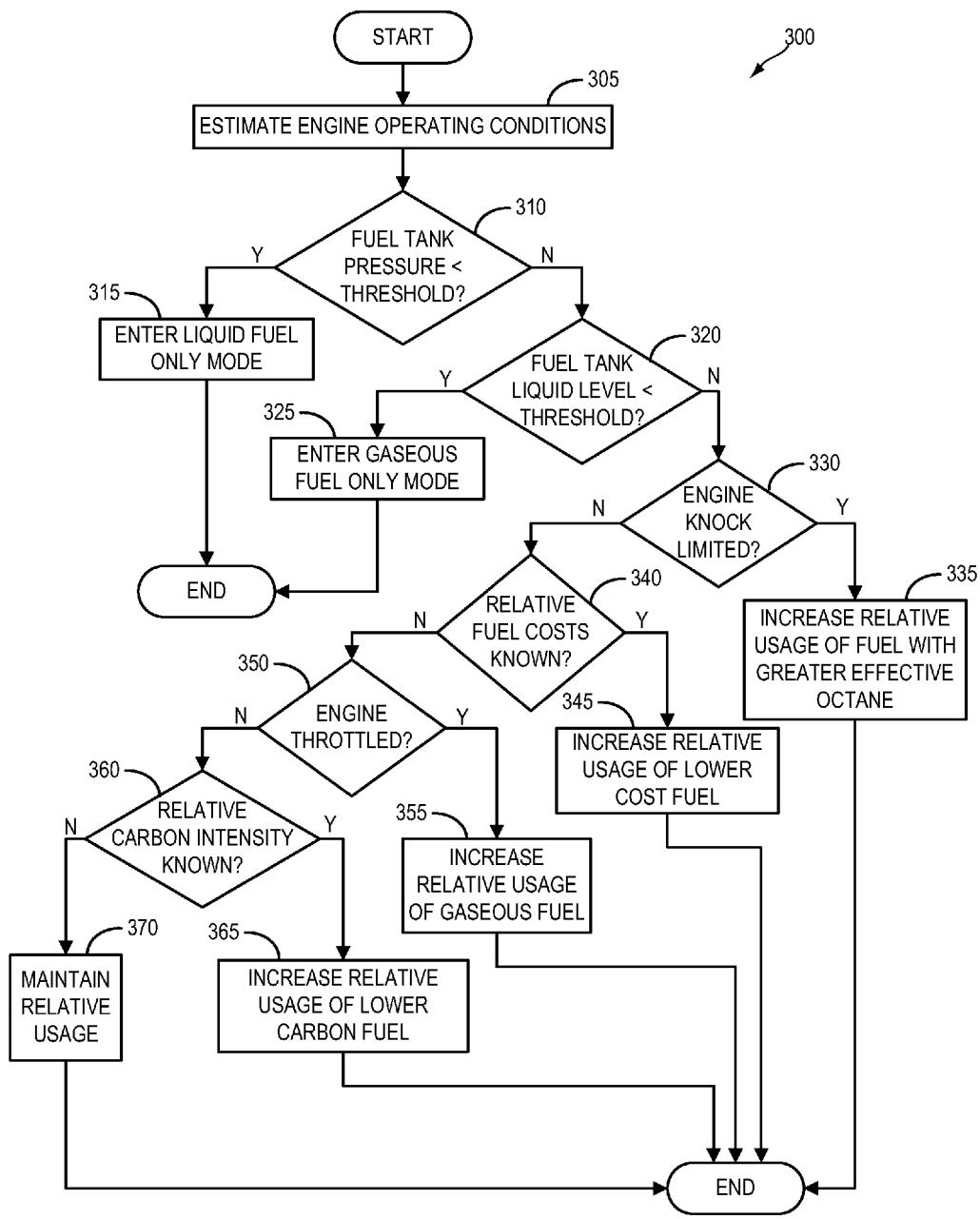
FIG. 3 shows an example high level flowchart for a fuel usage strategy for the engine and fuel system depicted in FIGS. 1 and 2.

The present description relates to systems and methods for fuel usage strategy for an engine system including a fuel system that operates on both liquid fuel and gaseous fuel, the two fuels stored together in a high pressure fuel tank. The engine system may include a cylinder configured with both a port fuel injector and a direct fuel injector as shown in FIG. 1. The engine system may include a multi-cylinder engine coupled to a fuel system with a fuel delivery system as depicted in FIG. 2. FIG. 3 illustrates an example method for a fuel usage strategy for the engine system depicted in FIGS. 1 and 2.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank that holds a liquid fuel, such as gasoline, and also holds a gaseous fuel, such as CNG. Fuel injectors 166 and 170 may be configured to inject fuel from the same fuel tank, from different fuel tanks, from a plurality of the same fuel tanks, or from an overlapping set of fuel tanks. While FIG. 1 depicts fuel injector 166 as a direct fuel injector and fuel injector 170 as a port fuel injector, in other embodiments both injectors 166 and 170 may be configured as port fuel injectors or may both be configured as direct fuel injectors.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller are described herein and with regards to FIG. 3.

FIG. 2 shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166 and 170. Although only one cylinder is shown coupled to fuel injectors, it is to be understood that all cylinders 14 included in cylinder head 201 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions.

Fuel system 172 includes fuel tank 200. Fuel tank 200 may include a liquid fuel, such as gasoline or diesel fuel, and may also include a gaseous fuel, such as CNG. Fuel tank 200 may be configured to store liquid fuel and gaseous fuel together at a relatively low pressure compared to conventional CNG storage (which is about 200-250 atmospheres). For example, the gaseous fuel may be added to a pressure of 100 atmospheres. In this way, a portion of the gaseous fuel may be dissolved in the liquid fuel. At 100 atmospheres, CNG may dissolve in gasoline to the point where 40% of the liquid fuel component in fuel tank 200 is CNG. Fuel tank 200 may include pressure sensor 211, temperature sensor 212, and liquid level sensor 215.

Fuel injector 166 may be coupled to fuel tank 200 in a configuration where liquid fuel stored in fuel tank 200 is delivered to fuel injector 166. Fuel injector 166 is shown coupled to fuel rail 205. Fuel rail 205 may be coupled to fuel line 220. Fuel rail 205 may include one or more sensors, such as pressure or temperature sensors. Fuel line 220 is coupled to fuel tank 200. Fuel line 220 may be coupled to a lower portion of fuel tank 200 in order draw liquid fuel from fuel tank 200. Fuel line may be coupled to fuel pump 210. In some cases, fuel pump 210 may be omitted from fuel system 172. In such embodiments, the pressure of gaseous fuel stored in fuel tank 200 may be used to drive liquid fuel from fuel tank 200 to fuel rail 205 via fuel line 220. In embodiments where fuel pump 210 is omitted, a liquid fuel valve may be coupled to fuel line 220 to control liquid fuel flow through fuel line 220.

Fuel injector 170 may be coupled to fuel tank 200 in a configuration where gaseous fuel stored in fuel tank 200 is delivered to fuel injector 170. Fuel injector 170 is shown coupled to fuel rail 206. Fuel rail 206 may be coupled to fuel line 221. Fuel rail 206 may include one or more sensors, such as pressure or temperature sensors. Fuel line 221 is coupled to fuel tank 200. Fuel line 221 may be coupled to an upper portion of fuel tank 200 in order draw gaseous fuel from fuel tank 200. Fuel line 221 may be coupled to one or more fuel pumps. Fuel line 221 may include a line valve, a pressure relief valve, a coalescing filter, and/or a pressure regulator. Fuel rail 206 may be configured to be a higher pressure fuel rail, and fuel rail 205 may be configured to be a lower pressure fuel rail. Fuel rail 205 may be configured to hold liquid fuel at a lower pressure than fuel tank 200. In such embodiments, some gaseous fuel may volatize from the liquid fuel/gaseous fuel emulsion. A pressure relief valve and/or scavenging line may be coupled to fuel rail 205 such that only liquid fuel is injected through fuel injector 166, and such that the gaseous fuel is removed and/or recycled from fuel system 172. In some embodiments, both fuel injectors 166 and 170 may be port fuel injectors, or both may be direct fuel injectors. Alternatively, liquid fuel injector 166 may be configured as a port fuel injector and gaseous fuel injector 170 may be a direct fuel injector.

Fuel system 172 is shown coupled to refueling system 250. Refueling system 250 may be coupled to fuel tank 200 via tank access valve 218. Tank access valve 218 may be coupled to refueling conduit 260. Refueling conduit 260 may include high pressure refueling port 255. High pressure refueling port 255 may be configured to receive a pressurized gaseous fuel pump nozzle, or a fuel pump nozzle configured to deliver a pre-pressured mixture of liquid fuel and gaseous fuel. In some cases, a second high pressure refueling port may be included to allow compatibility with more than one type of high pressure fuel pump nozzles.

Access to high pressure refueling port 255 may be regulated by refueling lock 257. In some embodiments, refueling lock 257 may be a fuel cap locking mechanism. The fuel cap locking mechanism may be configured to automatically lock a fuel cap in a closed position so that the fuel cap cannot be opened. For example, the fuel cap may remain locked via refueling lock 257 while pressure in the fuel tank is greater than a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 257 may be a filler pipe valve located at a mouth of refueling conduit 260. In such embodiments, refueling lock 257 may prevent the insertion of a refueling pump into refueling conduit 260. The filler pipe valve may be electrically locked, for example by a solenoid, or mechanically locked, for example by a pressure diaphragm.

In some embodiments, refueling lock 257 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 257 is locked using an electrical mechanism, refueling lock 257 may be unlocked by commands from controller 12, for example, when a fuel tank pressure decreases below a pressure threshold. In embodiments where refueling lock 257 is locked using a mechanical mechanism, refueling lock 257 may be unlocked via a pressure gradient, for example, when a fuel tank pressure decreases below a threshold.

Refueling conduit 260 may be coupled to low pressure refueling conduit 280. Low pressure refueling conduit may include low pressure refueling port 265 and check valve 290. Access to refueling port 265 may be regulated by refueling lock 267. Refueling lock 267 may comprise one of the examples described for refueling lock 257. Refueling locks 257 and 267 may be different mechanisms, and may be responsive to different tank pressure thresholds.

In some embodiments, low pressure refueling conduit 280 may be include a surge tank coupled between low pressure refueling port 265 and check valve 290. Surge tank 270 may include a liquid sensor. Low pressure refueling conduit 280 may further include a refueling pump coupled between the surge tank and check valve 290. The refueling pump may only operate when fuel tank pressure is below a threshold, and may only operate when there is liquid fuel in the surge tank, as sensed by the liquid sensor. In this way, the refueling pump may not pump an air/fuel mixture into fuel tank 200. Further, when fuel tank pressure reaches a threshold, the refueling pump may be shut off by controller 12, causing liquid fuel to accumulate in the surge tank. This may cause a liquid fuel dispenser nozzle engaged with low pressure refueling port 265 to turn itself off.

Optionally, a secondary tank may be coupled to fuel tank 200 via a gaseous fuel line. A depressurizing pump may be coupled to gaseous fuel line between fuel tank 200 and the secondary tank. The depressurizing pump may be activated to pump gaseous fuel out of fuel tank 200 and into the secondary tank. When a secondary tank is included in refueling system 250, fuel tank 200 may be actively depressurized to allow refueling with low pressure liquid fuel. The depressurizing pump may be activated to pump gaseous fuel or fuel vapor from fuel tank 200 into the secondary tank. Upon the tank pressure in fuel tank 200 decreasing below a threshold, refueling with low pressure liquid fuel may be allowed, for example by unlocking refueling lock 267.

FIG. 3 depicts an example routine 300 for a high-level method for fuel usage for a mixed liquid hydrocarbon/gaseous fuel system. Routine 300 will be described herein with reference to the components and systems depicted in FIGS. 1 and 2, though the method may be applied to other systems without departing from the scope of this disclosure. Routine 300 may be carried out by controller 12, and may be stored as executable instructions in non-transitory memory.

Method 300 may begin at 305 by estimating engine operating conditions. Engine operating conditions may be measured, estimated or inferred, and may include various vehicle conditions, such as vehicle speed, various fuel system conditions, such as fuel tank pressure, as well as various engine operating conditions, such as engine operating mode, engine speed, engine temperature, exhaust temperature, boost level, MAP, MAF, torque demand, horsepower demand, etc.

Continuing at 310, method 300 may include determining whether a fuel tank pressure is less than a pressure threshold. The fuel tank pressure may be determined via one or more pressure sensors, such as pressure sensor 211 as depicted in FIG. 2. The pressure threshold may be pre-determined, or may be determined based on engine operating conditions as assessed at 305. The pressure threshold may be higher in systems where fuel pump 210 is omitted. In such embodiments, a high gaseous fuel pressure may be required to drive the flow of liquid fuel from fuel tank 200 to fuel line 220 and further to fuel rail 205. If the system includes a fuel pump, the threshold tank pressure could be as low as 0 psi. The threshold may be set at a value equivalent to the amount of gaseous fuel needed to perform one or more cold starts. If the fuel tank pressure is less than the pressure threshold, method 300 may proceed to 315. At 315, method 300 may include entering a liquid fuel only mode. This may include operating on fuel injected through direct injector 166 and not operating on fuel injected through port fuel injector 170. In this way, gaseous fuel may be conserved when depleted without depriving the engine of fuel. Method 300 may then end.

If the fuel tank pressure is greater than the pressure threshold, method 300 may proceed to 320. At 320, method 300 may include determining whether the fuel tank liquid level is less than a liquid level threshold. The fuel tank liquid level may be determined via one or more liquid level sensors, such as liquid level sensor 215 as depicted in FIG. 2. The liquid level threshold may be predetermined, or may be determined based on engine operating conditions as assessed at 305. If the fuel tank liquid level is less than the liquid level threshold, method 300 may proceed to 325. At 325, method 300 may include entering a gaseous fuel only mode. This may include operating on fuel injected through port fuel injector 170 and not operating on fuel injected through direct fuel injector 166, and may further include de-activating fuel pump 210 when included in the system. Method 300 may then end.

If the fuel tank liquid level is greater than the liquid level threshold, method 300 may proceed to 330. At 330, method 300 may include determining whether the engine is currently knock limited. Determining whether the engine is knock limited may include comparing the amount of spark retard from MBT to a threshold spark retard. Determining whether the engine is knock limited may also include determining if engine knock events have been detected and/or anticipated by one or more sensors, such as a knock sensor. Determining whether the engine is knock limited may also include evaluating the recent history of engine control events, including determining if the detection or anticipation of engine knock led to spark ignition timing being retarded from MBT. If the engine is determined to be knock limited, method 300 may proceed to 335.

At 335, method 300 may include increasing the relative usage of the fuel with a greater effective octane. In this way, spark ignition timing may be advanced closer to MBT, increasing engine efficiency and performance. The effective octane of the liquid and gaseous fuels may be based on the octane rating for the fuels. The octane rating for the fuels may be determined empirically, or may be input through an interface at the time of refueling. However, the fuel with a greater octane rating may not necessarily have a greater effective octane. For example, CNG typically has a higher octane rating than do gasoline or diesel fuel. However, the gaseous fuel may include lower octane components, such as propane. Similarly, the liquid fuel may include higher octane components, such as ethanol. In embodiments where one fuel is coupled to a direct fuel injector and the second fuel is coupled to a port fuel injector, the effective octane of the fuels may be in part based on the differences in evaporative cooling occurring from the injection of the fuels.

In some embodiments, the fuel with the greatest effective octane may be a blend of the liquid and gas fuels. For example, when the fuel tank is highly pressurized, a percentage of CNG may dissolve in the liquid fuel. Thus, when the liquid fuel is delivered to fuel rail 205, it may contain CNG dissolved in liquid fuel. As described herein, and with regards to FIG. 2, some embodiments may depressurize liquid fuel at fuel rail 205, and may be configured to remove volatized gaseous fuel. In order to retain a higher octane fuel, fuel rail 205 may be pressurized to a higher pressure in order to maintain CNG dissolved in liquid fuel, or may otherwise retain the CNG component within the liquid fuel such that a pressurized CNG/liquid fuel mixture may be injected through direct injector 166.

As such the effective octane for each fuel or combination of fuels may be pre-programmed, learned, or determined iteratively through feedback knock sensing. Increasing the relative usage of the fuel with a greater effective octane may not include switching completely to the fuel with a greater effective octane. For example, an engine may be operating in dual-injection mode, with gaseous fuel port-fuel injected during intake and liquid fuel direct injected during intake and/or compression. In some embodiments, the amount of port-fuel injected fuel may be maintained or decreased and the amount of direct injected fuel may be increased accordingly. Increasing the relative usage of fuel with a greater effective octane may include iteratively increasing the relative usage of fuel with a greater effective octane. In these embodiments, the relative fuel usages may be altered repeatedly, based on feedback knock sensing or other parameters which may change as engine operating conditions change. Method 300 may then end.

If the engine is not knock limited, as determined at 330, method 300 may proceed to 340. At 340, method 300 may include determining if the relative fuel costs of each fuel stored in the fuel tank are known. If the relative fuel costs of each fuel stored in the fuel tank are known, method 300 may proceed to 345. At 345, method 300 may include increasing the usage of the lower cost fuel. For example, CNG may be less expensive than gasoline. In this example, the relative amount of CNG used for combustion would increase relative to the amount of gasoline used for combustion. Increasing the relative usage of lower cost fuel may not include stopping usage of the higher cost fuel. As described herein, liquid fuel delivered to fuel rail 205 may comprise dissolved CNG in liquid fuel. Increasing the relative usage of lower cost fuel may include altering the process of removing CNG from liquid fuel at or entering fuel rail 205, such that more or less CNG is retained in the pressurized liquid fuel depending on the desired effect.

Relative fuel costs may be manually input by an operator through an interface coupled to controller 12. In some embodiments, the vehicle may automatically receive fuel cost information from the fuel station, from the internet, from a navigation system, etc. The relative fuel cost may be based on the price of fuel at the most recent refueling stop, and/or may be based on the price of fuel at the closest refueling station to the vehicle. The relative fuel cost may be based on the relative availability of each fuel. For example, a vehicle trip may be programmed into a vehicle navigation system. If one fuel were unavailable for refueling based on the programmed trip (e.g. car is traversing a route without CNG refueling stations), the lower cost fuel may be the fuel that is more readily available for refueling. After increasing the usage of lower cost fuel, method 300 may end.

If the relative fuel costs of each fuel stored in the fuel tank are not known, method 300 may proceed to 350. At 350, method 300 may include determining whether the engine is operating under throttled conditions. Determining whether the engine is operating under throttled conditions may include comparing engine load, throttle position, MAP, etc. to a threshold or series of thresholds. If the engine is operating under throttled conditions, method 300 may proceed to 355. At 355, method 300 may include increasing the relative usage of the gaseous fuel. Increasing the relative usage of gaseous fuel may not include stopping usage of liquid fuel. Gaseous fuel occupies more volume than does liquid fuel. By increasing the relative amount of gaseous fuel, less pumping work is done while the engine is operating under throttled conditions. Further, CNG has less evaporative cooling than gasoline or diesel fuel; increasing usage of gaseous fuel may lead to less pumping work for this reason also. In some embodiments, such as a system including a naturally aspirating engine, it may be possible to determine whether the engine is approaching an unthrottled operating condition. For example MAP increasing above a threshold may signify the end of a throttled operating condition. In such embodiments, the usage of liquid fuel may be increased accordingly.

If the engine is not operating under throttled conditions, method 300 may proceed to 360. At 360, method 300 may include determining whether the relative carbon intensities of each fuel stored in the fuel tank are known. If the relative carbon intensities of each fuel stored in the fuel tank are known, method 300 may proceed to 365. At 365, method 300 may include increasing the relative usage of the lower carbon fuel. Increasing the relative usage of the lower carbon fuel may not include stopping the usage of the higher carbon fuel. In some embodiments, the relative carbon intensities may be known or pre-programmed. For example, CNG has a lower carbon intensity than gasoline or diesel fuel due to its lower carbon-to-hydrogen ratio. In some embodiments, a user may update the properties of the fuel through an interface upon refueling. Alternatively or additionally, the fuel properties may be obtained from the refueling station, from the internet, or determined iteratively. For example, an adjustment may be made to account for alcohol content in the liquid fuel, such as E10, E85, etc. In some embodiments, the carbon intensity may be adjusted based on the renewable fuel content, such as ethanol, bio-methane, or biodiesel.

If the relative carbon intensities of each fuel stored in the fuel tank are not known, method 300 may proceed to 370. At 370, method 300 may include maintaining the relative usage of the gaseous fuel and the liquid fuel. Method 300 may then end.

The systems described herein and depicted in FIGS. 1 and 2 and the methods described herein and depicted in FIG. 3 may enable one or more methods. In one example, a method for an engine, comprising: responsive to a pressure in a fuel tank being below a pressure threshold, injecting only a liquid fuel into an engine cylinder, the fuel tank storing the liquid fuel and a pressurized gaseous fuel partially dissolved in the liquid fuel. The method may further comprise: responsive to a liquid level in the fuel tank being below a liquid level threshold, injecting only the pressurized gaseous fuel into the engine cylinder. The method may further comprise: responsive to a spark ignition retard being greater than a threshold, adjusting a ratio of liquid fuel to pressurized gaseous fuel injected into the engine cylinder based on an effective octane of the liquid fuel and an effective octane of the pressurized gaseous fuel. In some embodiments, the method may further comprise: adjusting a ratio of liquid fuel to pressurized gaseous fuel injected into the engine cylinder based on a cost per unit fuel energy of the liquid fuel and a cost per unit fuel energy of the pressurized gaseous fuel. In some embodiments, the method may further comprise: responsive to an engine load being less than a threshold, increasing a ratio of pressurized gaseous fuel to liquid fuel injected into the engine cylinder. The method may further comprise: responsive to a manifold absolute pressure increasing above a threshold, increasing the ratio of liquid fuel to pressurized gaseous fuel injected into the engine cylinder. In some embodiments, the method may further comprise: adjusting a ratio of liquid fuel to pressurized gaseous fuel injected into the engine cylinder based on a carbon-to-hydrogen ratio of the liquid fuel and a carbon-to-hydrogen ratio of the pressurized gaseous fuel. In some embodiments, the liquid fuel is gasoline, diesel fuel, or a gasoline-alcohol blend (e.g. E10, E85, M15, or M85) and the pressurized gaseous fuel is CNG. In some examples, the pressurized gaseous fuel is port fuel injected into the engine cylinder, and the liquid fuel is direct fuel injected into the engine cylinder. Other embodiments may use two port fuel injectors or two direct fuel injectors per cylinder. In some embodiments, the pressurized gaseous fuel may be direct fuel injected into the engine cylinder, and the liquid fuel may be port fuel injected into the engine cylinder. The technical result of implementing this method is the elimination of a need for a dedicated electric liquid fuel pump, as liquid fuel may be driven to a fuel rail by the pressure gradient generated by the pressurized gaseous fuel as long as the fuel tank pressure remains above a threshold pressure.

In another example, a method for an engine having a fuel tank configured to store a liquid fuel and a pressurized gaseous fuel capable of partially dissolving in the liquid fuel, comprising: responsive to a pressure in the fuel tank being below a pressure threshold, injecting only a liquid fuel into an engine cylinder; and responsive to a liquid level in the fuel tank being below a liquid level threshold, injecting only the pressurized gaseous fuel into the engine cylinder. The method may further comprise: responsive to a spark ignition retard being greater than a threshold, adjusting a ratio of liquid fuel to pressurized gaseous fuel injected into the engine cylinder based on an effective octane of the liquid fuel and an effective octane of the pressurized gaseous fuel; and responsive to a spark ignition retard being less than a threshold, adjusting the ratio of liquid fuel to pressurized gaseous fuel injected into the engine cylinder based on a cost per unit fuel energy of the liquid fuel and a cost per unit fuel energy of the pressurized gaseous fuel. The method may further comprise: responsive to an engine load being less than a threshold, increasing a ratio of pressurized gaseous fuel to liquid fuel injected into the engine cylinder; and responsive to an engine load being greater than a threshold, adjusting a ratio of liquid fuel to pressurized gaseous fuel injected into the engine cylinder based on a carbon-to-hydrogen ratio of the liquid fuel and a carbon-to-hydrogen ratio of the pressurized gaseous fuel. In some embodiments, the liquid fuel may be gasoline or diesel fuel and the pressurized gaseous fuel may be CNG. The technical result of implementing this method is the enabling of a comprehensive fuel usage strategy for an engine system with a single, mixed-fuel tank which prioritizes a balance of fuel cost, engine efficiency and CO2 emissions, while avoiding running out of either fuel.

The systems described herein and depicted in FIGS. 1 and 2 and the methods described herein and depicted in FIG. 3 may enable on or more systems. In one example, a fuel system for an internal combustion engine, comprising: a fuel tank configured to store a liquid fuel and a pressurized gaseous fuel capable of partially dissolving in the liquid fuel; a group of direct fuel injectors in communication with a group of cylinders; a first fuel line coupled between the group of direct fuel injectors and the fuel tank, the first fuel line configured to supply liquid fuel to the group of direct fuel injectors; a group of port fuel injectors in communication with the group of cylinders; a second fuel line coupled between the group of port fuel injectors and the fuel tank, the second fuel line configured to supply pressurized gaseous fuel to the group of port fuel injectors; and a controller configured with instructions stored in non-transitory memory and executable by a processor to: responsive to a pressure in the fuel tank being below a pressure threshold, operating the group of cylinders with fuel from the group of direct fuel injectors, and not with fuel from the group of port fuel injectors. The controller may be further configured with instructions stored in non-transitory memory and executable by a processor to: responsive to a liquid level in the fuel tank being below a liquid level threshold, operating the group of cylinders with fuel from the group of port fuel injectors, and not with fuel from the group of direct fuel injectors. The controller may be further configured with instructions stored in non-transitory memory and executable by a processor to: responsive to a spark ignition retard being greater than a threshold, adjust a ratio of fuel injected into the group of engine cylinders by the group of direct fuel injectors to fuel injected into the group of engine cylinders by the group of port fuel injectors based on an effective octane of the liquid fuel and an effective octane of the pressurized gaseous fuel. The controller may be further configured with instructions stored in non-transitory memory and executable by a processor to: adjust a ratio of fuel injected into the group of engine cylinders by the group of direct fuel injectors to fuel injected into the group of engine cylinders by the group of port fuel injectors based on a cost per unit fuel energy of the liquid fuel and a cost per unit fuel energy of the pressurized gaseous fuel. The controller may be further configured with instructions stored in non-transitory memory and executable by a processor to: responsive to an engine load being less than a threshold, increase a ratio of fuel injected into the group of engine cylinders by the group of port fuel injectors to fuel injected into the group of engine cylinders by the group of direct fuel injectors. In some embodiments, the controller may be further configured with instructions stored in non-transitory memory and executable by a processor to: responsive to a manifold absolute pressure increasing above a threshold, increase a ratio of fuel injected into the group of engine cylinders by the group of direct fuel injectors to fuel injected into the group of engine cylinders by the group of port fuel injectors. In some examples the controller may be further configured with instructions stored in non-transitory memory and executable by a processor to: adjust a ratio of fuel injected into the group of engine cylinders by the group of direct fuel injectors to fuel injected into the group of engine cylinders by the group of port fuel injectors based on a carbon-to-hydrogen ratio of the liquid fuel and a carbon-to-hydrogen ratio of the pressurized gaseous fuel. The technical result of implementing this system is an engine coupled to a single, mixed-fuel tank where fuel usage is continuously reprioritized as engine operating conditions change without compromising engine efficiency and while maintaining baseline stores of both liquid and gaseous fuels.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   responsive to a pressure in a fuel tank being below a pressure threshold, injecting only a liquid fuel into an engine cylinder, the fuel tank storing the liquid fuel and a pressurized gaseous fuel partially dissolved in the liquid fuel; and
   responsive to a liquid level in the fuel tank being a liquid level threshold, injecting only the pressurized gaseous fuel into the engine cylinder.

2. The method of claim 1, further comprising:
   responsive to a spark ignition retard being greater than a threshold, adjusting a ratio of liquid fuel to pressurized gaseous fuel injected into the engine cylinder based on an effective octane of the liquid fuel and an effective octane of the pressurized gaseous fuel.

3. The method of claim 1, further comprising:
   adjusting a ratio of liquid fuel to pressurized gaseous fuel injected into the engine cylinder based on a cost per unit fuel energy of the liquid fuel and a cost per unit fuel energy of the pressurized gaseous fuel.

4. The method of claim 1, further comprising:
responsive to an engine load being less than a threshold, increasing a ratio of pressurized gaseous fuel to liquid fuel injected into the engine cylinder.

5. The method of claim 4, further comprising:
responsive to a manifold absolute pressure increasing above a threshold, increasing the ratio of pressurized gaseous fuel to liquid fuel injected into the engine cylinder.

6. The method of claim 1, further comprising:
adjusting a ratio of liquid fuel to pressurized gaseous fuel injected into the engine cylinder based on a carbon-to-hydrogen ratio of the liquid fuel and a carbon-to-hydrogen ratio of the pressurized gaseous fuel.

7. The method of claim 1, wherein the liquid fuel is gasoline, diesel fuel, or a gasoline-alcohol blend, and the pressurized gaseous fuel is compressed natural gas.

8. The method of claim 1, wherein one or both of the pressurized gaseous fuel and the liquid fuel is direct fuel injected into the engine cylinder.

9. A fuel system for an internal combustion engine, comprising:
one of more sensors;
a fuel tank configured to store a liquid fuel and a pressurized gaseous fuel capable of partially dissolving in the liquid fuel;
a group of direct fuel injectors in communication with a group of cylinders;
a first fuel line coupled between the group of direct fuel injectors and the fuel tank, the first fuel line configured to supply liquid fuel to the group of direct fuel injectors;
a group of port fuel injectors in communication with the group of cylinders;
a second fuel line coupled between the group of port fuel injectors and the fuel tank, the second fuel line configured to supply pressurized gaseous fuel to the group of port fuel injectors; and
a controller configured with instructions stored in non-transitory memory and executable by a processor to:
responsive to a pressure in the fuel tank being below a pressure threshold, the pressure being determined from at least one of the one or more sensors, operating the group of cylinders with fuel from the group of direct fuel injectors, and not with fuel from the group of port fuel injectors.

10. The fuel system of claim 9, where the controller is further configured with instructions stored in non-transitory memory and executable by the processor to:
responsive to a liquid level in the fuel tank being below a liquid level threshold, the liquid level being determined from at least one of the one or more sensors, operating the group of cylinders with fuel from the group of port fuel injectors, and not with fuel from the group of direct fuel injectors.

11. The fuel system of claim 10, further comprising a spark plug with an associated spark ignition, where the controller is further configured with instructions stored in non-transitory memory and executable by the processor to:
responsive to a spark ignition retard being greater than a threshold, adjust a ratio of fuel injected into the group of cylinders by the group of direct fuel injectors to fuel injected into the group of cylinders by the group of port fuel injectors based on an effective octane of the liquid fuel and an effective octane of the pressurized gaseous fuel, the effective octane of the liquid and gaseous fuels being determined from at least one of the one or more sensors.

12. The fuel system of claim 10, where the controller is further configured with instructions stored in non-transitory memory and executable by the processor to:
adjust a ratio of fuel injected into the group of cylinders by the group of direct fuel injectors to fuel injected into the group of cylinders by the group of port fuel injectors based on a cost per unit fuel energy of the liquid fuel and a cost per unit fuel energy of the pressurized gaseous fuel, the cost per unit fuel energy of the liquid and gaseous fuels being input by an operator and/or received from the Internet.

13. The fuel system of claim 10, where the controller is further configured with instructions stored in non-transitory memory and executable by the processor to:
responsive to an engine load being less than a threshold, increase a ratio of fuel injected into the group of cylinders by the group of port fuel injectors to fuel injected into the group of cylinders by the group of direct fuel injectors.

14. The fuel system of claim 13, where the controller is further configured with instructions stored in non-transitory memory and executable by the processor to:
responsive to a manifold absolute pressure increasing above a threshold, the manifold absolute pressure being determined from at least one of the one or more sensors, increase a ratio of fuel injected into the group of cylinders by the group of direct fuel injectors to fuel injected into the group of cylinders by the group of port fuel injectors.

15. The fuel system of claim 10, where the controller is further configured with instructions stored in non-transitory memory and executable by the processor to:
adjust a ratio of fuel injected into the group of cylinders by the group of direct fuel injectors to fuel injected into the group of cylinders by the group of port fuel injectors based on a carbon-to-hydrogen ratio of the liquid fuel and a carbon-to-hydrogen ratio of the pressurized gaseous fuel, the carbon-to-hydrogen ration of the liquid and gaseous fuels being entered by an operator and/or received from the Internet.

16. A method for an engine having a fuel tank configured to store a liquid fuel and a pressurized gaseous fuel capable of partially dissolving in the liquid fuel, comprising:
responsive to a pressure in the fuel tank being below a pressure threshold, injecting only the liquid fuel into an engine cylinder; and
responsive to a liquid level in the fuel tank being below a liquid level threshold, injecting only the pressurized gaseous fuel into the engine cylinder.

17. The method of claim 16, further comprising:
responsive to a spark ignition retard being greater than a threshold, adjusting a ratio of liquid fuel to pressurized gaseous fuel injected into the engine cylinder based on an effective octane of the liquid fuel and an effective octane of the pressurized gaseous fuel; and
responsive to a spark ignition retard being less than the threshold, adjusting the ratio of liquid fuel to pressurized gaseous fuel injected into the engine cylinder based on a cost per unit fuel energy of the liquid fuel and a cost per unit fuel energy of the pressurized gaseous fuel.

18. The method of claim 17, further comprising:
responsive to an engine load being less than a threshold, increasing a ratio of pressurized gaseous fuel to liquid fuel injected into the engine cylinder; and
responsive to an engine load being greater than the threshold, adjusting a ratio of liquid fuel to pressurized gaseous fuel injected into the engine cylinder based on a carbon-to-hydrogen ratio of the liquid fuel and a carbon-to-hydrogen ratio of the pressurized gaseous fuel.

19. The method of claim 18, where the liquid fuel is gasoline, diesel fuel, or a gasoline-alcohol blend, and the pressurized gaseous fuel is compressed natural gas.

* * * * *